Jan. 23, 1962  R. J. SIGLER ETAL  3,017,707
EXCAVATION MACHINE
Filed Jan. 4, 1960  7 Sheets-Sheet 1

FIG. 1.

Richard J. Sigler
John J. Schnellbacher
INVENTORS

BY Hayden & Pravel

ATTORNEYS

Jan. 23, 1962   R. J. SIGLER ETAL   3,017,707
EXCAVATION MACHINE
Filed Jan. 4, 1960   7 Sheets-Sheet 3

Richard J. Sigler
John J. Schnellbacher
INVENTORS

BY Hayden & Pravel

ATTORNEYS

Jan. 23, 1962   R. J. SIGLER ETAL   3,017,707
EXCAVATION MACHINE
Filed Jan. 4, 1960   7 Sheets-Sheet 4

Richard J. Sigler
John J. Schnellbacher
INVENTORS BY Hayden & Pravel

ATTORNEYS

United States Patent Office 3,017,707
Patented Jan. 23, 1962

3,017,707
EXCAVATION MACHINE
Richard J. Sigler and John J. Schnellbacher, Houston, Tex., assignors, by mesne assignments, to Reed Roller Bit Company, Houston, Tex., a corporation of Texas
Filed Jan. 4, 1960, Ser. No. 352
17 Claims. (Cl. 37—2)

The present invention is directed to the construction and assembly of an excavating machine especially adaptable for use in the transplantation of trees.

The present application is a continuation-in-part of prior copending application Serial No. 780,012, filed December 12, 1958, now abandoned, for Excavation Machine and Method, and all common subject matter is entitled to the filing date of said prior application.

An object of this invention resides in the provision of tree moving machinery, the utilization of which has been found to result in an expeditious and economical transplanting operation. The transplantation of trees, particularly those trees which have reached an appreciable size, has heretofore been a laborious and seldom successful endeavor. This is generally the result of the disarrangement and careless damage to the root structure adjacent the holes of the trees, and the relatively long exposure to air of the roots which, in turn, causes rapid oxidation and dehydration of the roots and resultant decay, and as a consequence, many trees fail to survive in their new locations after transplantation. However, use of the instant apparatus has been found to result in a high percentage of success relative to that which previously known apparatuses for this purpose have accomplished.

Another object of this invention is to make available a tree removal machine wherein a minimum amount of labor or man-power is necessary to the operation and performance of the steps thereof. It is possible, when using the machine herein described and illustrated, that only a single operator is required in order to perform the entire tree moving operation.

Further objects and advantages of the present invention are to supply a mobile tree moving machine which is capable not only of performing the operation of removing a growing tree from the ground, but further of transporting the tree, either over land or on highways, to a preselected new location and replanting it.

A still further object is the provision of a tree removal machine which is capable of the removal of a large section of earth and root structure along with a tree, thereby enhancing the tree's chances for survival in its new location.

Another advantage of the present construction and assembly is that the apparatus which is used for the digging and removal of the tree may also be used for the transportation thereof to the newly selected location, and further that this apparatus may also be utilized in positioning the tree at the aforesaid new location.

Other and further objects and advantages of the instant invention will become more evident from a consideration of the following specification, when read in conjunction with the annexed drawings, in which:

Proceeding now to a more detailed description of this invention, it is to be noted in the several figures of the drawings that the tree moving apparatus is generally denoted by reference numeral 10, and is mounted rearwardly of a specially constructed and assembled automotive vehicle 12. The vehicle 12 has a cab structure 14 mounted forwardly thereof which includes the engine housing 15, and a pair of longitudinally extending, laterally spaced and substantially parallel confronting main frame chassis members 16, 18 which extend rearwardly from the aforesaid cab 14. Dual rear wheels 20 are provided and are conventionally mounted as well as front wheels 21. Also, one or more main cross-brace members or spacers 22 for the chassis frame members 16, 18 may be provided, as needed for strengthening reasons, intermediate the ends thereof.

Although the vehicle 12 is illustrated with dual rear wheels 20, it may be desirable to equip the vehicle 12 with dual wheels 20 in tandem on each side of the vehicle 12, especially when the tree digging apparatus 10 is relatively large. Further, because of the leverage action of the apparatus 10 on the vehicle 12 when the apparatus 10 is fully loaded and in elevated position (FIG. 8), it may be necessary to add weight 12' to the forward position of the vehicle 12 to prevent the raising of the forward portion of the vehicle 12 off the ground G. Such weight 12' is preferably a large concrete block secured to the front bumper or frame of the vehicle 12 by bolts or other suitable means.

Figure 1:
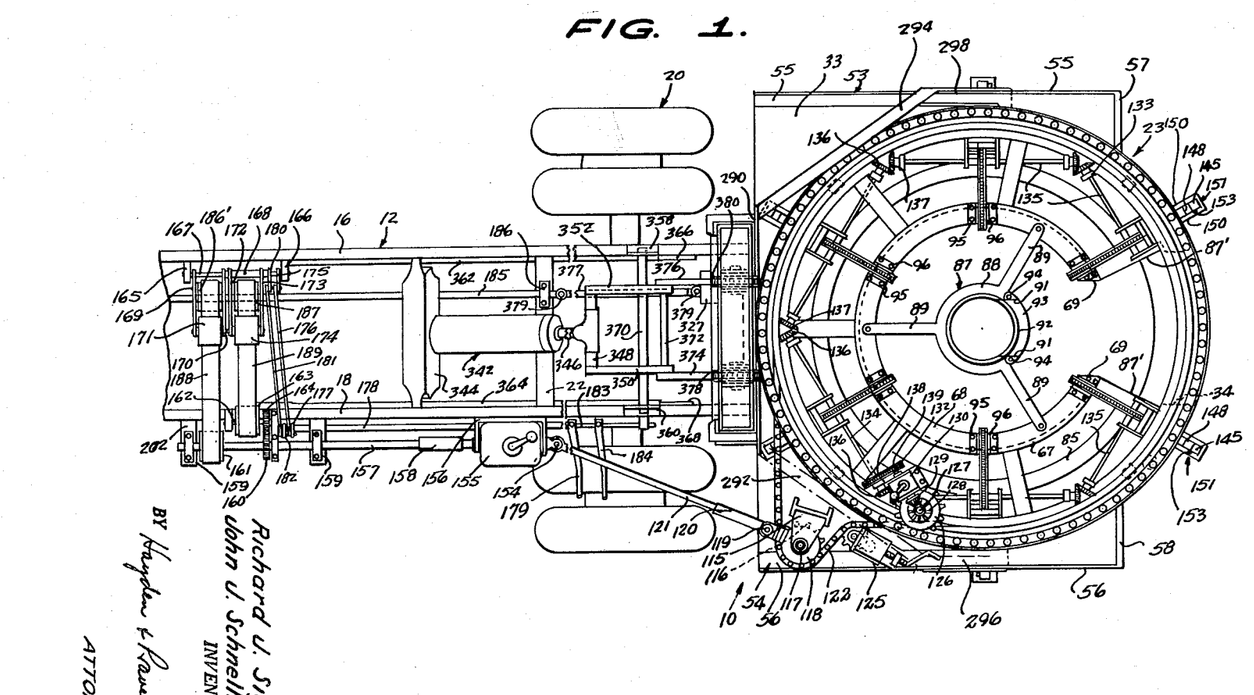
FIG. 1 is a top plan view of a tree moving machine constructed and assembled in accordance with the teachings of this invention, FIG. 1 including a fragmentary top plan view of a portion of the chassis of a power driven wheeled vehicle on which the machine is mounted.
Figure 3:
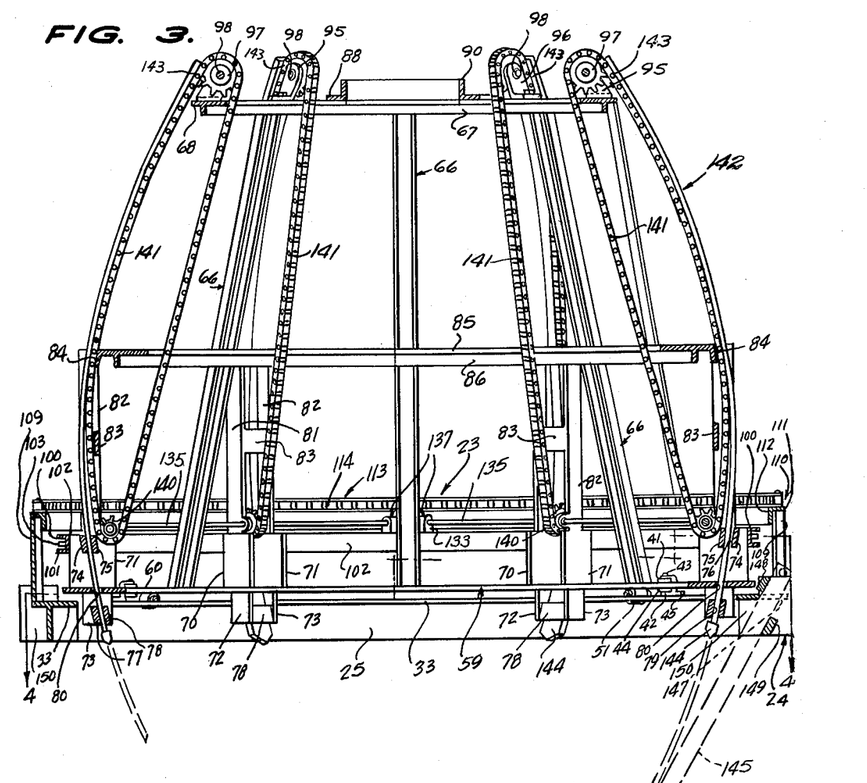
FIG. 3 is an enlarged medial detail transverse cross-sectional view of the excavating machine and portage frame assembly constructed in accordance with this invention, this section being taken substantially along the vertical plane of section line 3—3 of FIG. 2, looking in the direction of the arrows, certain portions of the device being omitted from the view for the purposes of clarity of illustration.
Figures 4, 5, 10A:
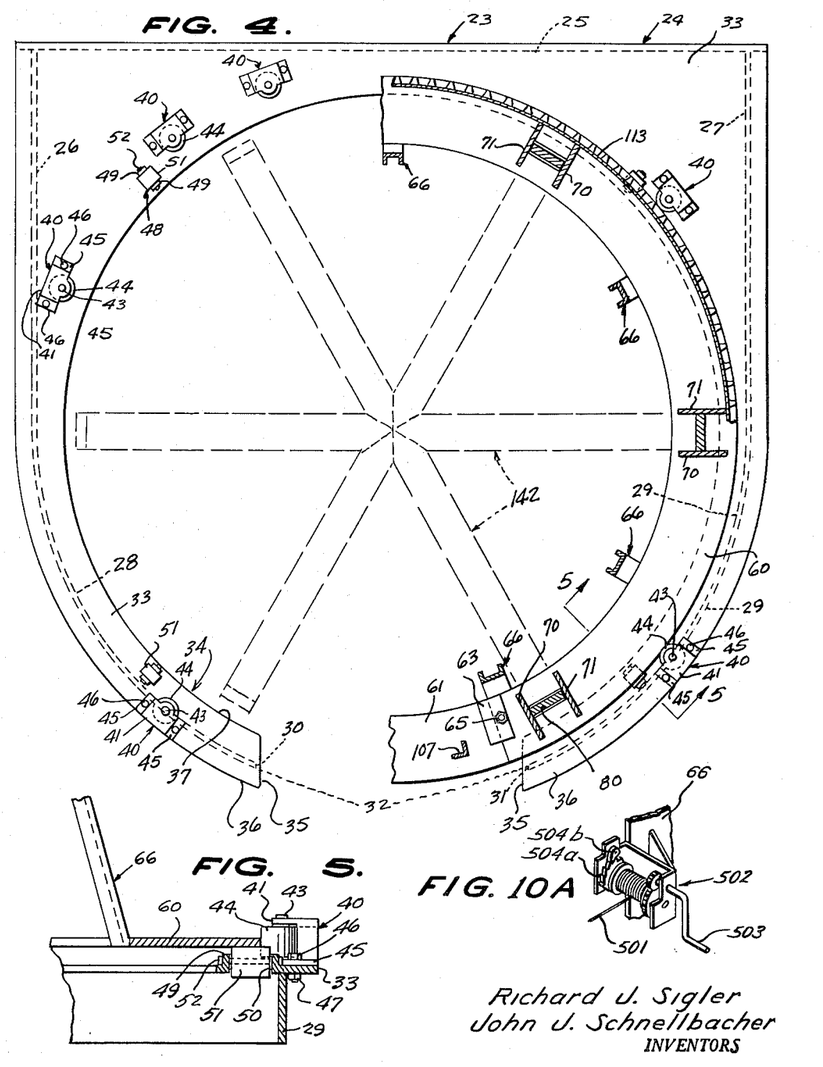
FIG. 4 is a fragmentary detail cross-sectional view taken substantially along the section line 4—4 of FIG. 3, looking in the direction of the arrows.
FIG. 5 is an enlarged, fragmentary detail cross-sectional view taken substantially along the inclined plane of section line 5—5 of FIG. 4, looking in the direction of the arrows.
FIG. 10A is an enlarged isometric view of the hand winch illustrated in FIG. 10.
Figure 6:
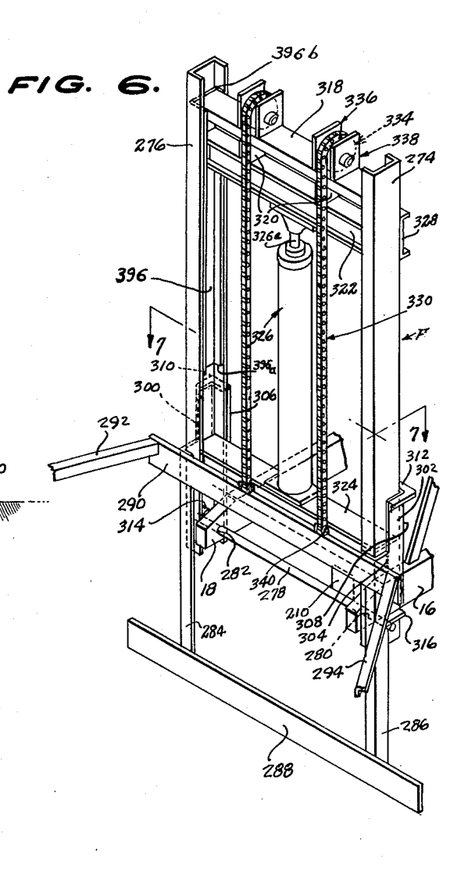
FIG. 6 is a perspective view of a portion of the lift and tilting mechanism of the device.
Figure 7:
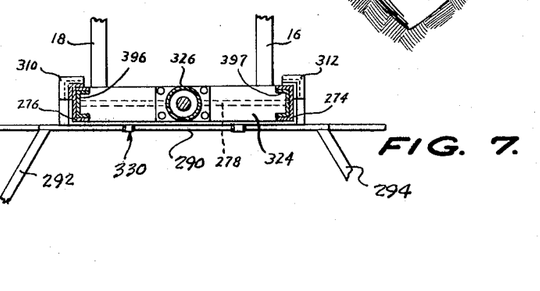
FIG. 7 is a transverse detail cross-sectional view taken substantially along the horizontal plane of section line 7—7 of FIG. 6, looking in the direction of the arrows.

A main digging and portage frame 23, best seen in FIGS. 1, 3 and 4, is mounted rearwardly of the vehicle chassis frame members 16 and 18 by means which are described more fully below. The frame 23 has a substantially rectangular, open, stationary flanged base 24 including a rectilinear leading flange 25 from the remote ends of which project side flanges 26, 27 which terminate at their trailing ends in inwardly curved arcuate extensions 28, 29 having spaced confronting ends 30, 31 forming a slot 32 therebetween. The base 24 is rigidly secured to the underside of a substantially flat base platform or outer table 33 in inwardly spaced relation relative to the marginal edges of the latter. As seen in FIG. 4, the platform 33 is formed with a transversely extending keyhole slot 34 which includes an elongated substantially rectangular entry slot 35 extending inwardly from the trailing ends 36 of the platform 33 and vertically registers with the slot 32. The inner end of the entry slot 35 is in open communication with an enlarged substantially circular, transversely extending slot 37, the function of the slots 35, 37 to be more fully described below.

A plurality of side roller hollow bracket assemblies are secured to the upper side of the platform 33 and extend from each side of the slot 35 circumferentially and in spaced relationship. Each of the side roller assemblies includes a hollow rectangular roller housing 40 (see FIGS. 4 and 5) having a face thereof opening towards the center of the circular slot 37. Each of the housings 40 includes a top and bottom journal arm 41, 42 which support for rotation therebetween a normally vertical shaft 43 of a roller 44 which projects partially beyond the open face of the housing 40, and a mounting flange 45 at each side of the housing 40 which is fixedly secured to the base platform 33 as by bolts 46 and nuts 47.

Likewise, a plurality of circumferentially spaced bottom roller assemblies 48 are arranged on the base platform 33 proximate to the roller assemblies 40 with the axis of the former being substantially normal to the axis of the latter. The assemblies 48 each include a pair of roller axle support journals 49 fixedly secured to the base platform 33 on the opposite sides of a like plurality of slots 50 extending transversely through the base platform or outer table 33 and between the journals 49. Rollers 51 are fixed on axles 52 journaled for rotation in the journals 49, the rollers 51 extending partially through the slots 50.

A pair of L-shaped angle members 53, 54 have their respective sides 55, 56 fixedly secured to the upper side of the platform base 33 along a portion of their length, the angle members 53, 54 having depending sides 55, 56, which terminate in inwardly extending brackets 57, 58, the inner ends of which are rigidly secured to the arcuate extensions 28, 29 of the side flanges 26, 27. The brackets 57, 58 are adapted to support conventional vehicle lights and license plates (not shown).

Figure 9:
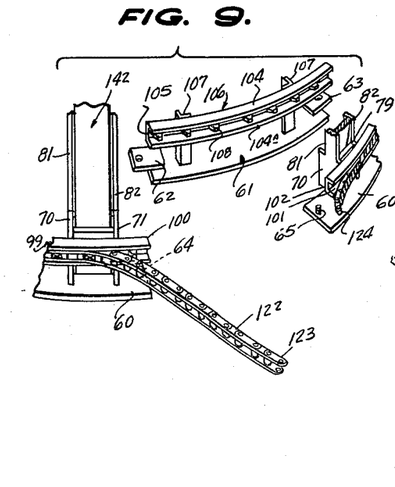
FIG. 9 is an enlarged detail exploded perspective view of the excavating and portage frame.

A main blade carriage 59 is composed of a substantially flat, annular roller riding member or inner table 60, a portion 61 (see FIG. 9) of which is releasably secured thereto by tongues 62, 63 engageable on pins 64, 65 secured to the member 60, whereby the removing of the portion 61 provides an opening in the carriage 59 of substantially equal size relative to the openings 32, 35.

A plurality of channel members 66 have their lower ends fixedly secured to the inner table 60 and extend convergingly upwardly therefrom to form a superstructure. The superstructure may include other structure extending above the member 60 and connected to the channel members 66 as more fully described hereinafter. The channel members at their upper ends are rigidly secured to the flange 67 of an arcuate tree trunk support 68. The arcuate tree trunk support 68 has an opening or interruption 69 formed therein which, under certain given conditions, is adapted to be co-aligned with the openings 32, 35 (see FIG. 4).

Arranged in circumferentially spaced relation around the roller riding member 60 are a plurality of grouped upright pairs of substantially rectangular bracket plates 70, 71 projecting from one side of the member 60 and disposed in laterally spaced relation relative to each other, and depending from the other side of the member 60 is a similar group of depending pairs of bracket plates 72, 73 also disposed in laterally spaced relation (see FIGS. 3 and 4). Between each group of the plates 70, 71 adjacent the upper ends thereof transversely extend a pair of spaced substantially rectangular excavating blade guides or cross blocks 74, 75 laterally spaced from each other and inclined at an angle relative to a horizontal plane to form downwardly converging blade guide slots 76 therebetween. In a similar manner, bracket plates 72, 73 have rigidly secured thereto a pair of transversely extending, laterally spaced and inclined blade guides 77, 78 adjacent their respective lower ends and forming a blade guide slot 79 therebetween. As is seen in FIG. 3 and FIG. 4, the roller riding member or inner table 60 is disposed intermediate the groups of blade guide plates or blocks 74, 75 and 77, 78 and is formed with a substantially rectangular transversely extending blade slot 80 disposed in arcuate alignment with the slots 76 and 79. The slots 80 are of such size as to freely and loosely receive the blades (to be described below) for reciprocation therethrough.

From the upper ends of each of the pairs of plates 70, 71 arise a pair of substantially rectangular, normally upright standards or integrally formed upward arm extensions 81, 82, respectively, between which extend one or more cross-braces or spaced elements 83 which also double as chain guides in a manner to be described infra.

To the upper ends of the standards 81, 82 is secured a flange 84 which diverges downwardly and away from an annular reinforcing element 85 having a depending integral annular strengthening rib 86. The flange 84 and rib 86 are discontinuous at 87' to form an opening registering with the opening formed between adjacent ends of the roller riding member 60.

An annular spider 87 (see FIG. 1) includes a ring element 88 from which radially extend a plurality of circumferentially spaced arms 89 having their outer ends rigidly secured to the tree trunk support 68. The ring element 88 is provided with an integrally formed upright cylindrical collar 92, and the collar and ring element are split at 91 to form a removable portion or flange 93, the removable portion being detachably connected thereon by pins 94 forming a slot facing the slot 69.

The annular spider 87 may be removed if desired and is not included in the preferred embodiment of the invention. Suitable padding or protection means such as a rubber mat may be placed around the trunk of the tree and secured thereto to protect the trunk of the tree from accidental damage as a result of contact with the arcuate support 68, the annular spider 87 if used, or any other part of the device 10.

Mounted between sprocket wheel brackets 95, 96 secured in circumferentially spaced relation on the tree trunk support 68 are a plurality of sprockets 97 affixed to axles 98, the opposed ends of the latter being journaled between the brackets 95, 96.

Circumscribing the outer ends of the bracket plates 70, 71 and rigidly secured thereto is a substantially U-shaped split annular channel member or annular link element 99 having opposed sides 100, 101 and a central bight 102, the channel member 99 facing outwardly and having a plurality of circumferentially spaced gear teeth 103 which project laterally from the bight 102. The channel member 99 has its respective sides and bight coplanar with the sides 104, 104A and bight 105 (see FIG. 9), of a channel shaped insert 106 to the outer side of the bight 105 of which is secured the upper ends of a plurality of supports 107, the lower ends of which are rigidly secured to the insert plate 61. A plurality of arcuately spaced gear teeth 108 project from the bight 105 and are aligned with the teeth 103. With the insert in place and secured on the pins 64 and 65, the teeth 103, 108 form a continuous circumferential gear.

At circumferentially spaced intervals, a plurality of supports 109 are secured to the marginal circumferential edge of the base platform 33 and to the upper ends of which are secured an inverted annular L-shaped flange 110 having an upper and lower side 111, 112, respectively, rigidly secured thereto, the upper side 111 being normally parallel to a horizontal plane. To the upper side 111 is fixedly secured a ring gear 113 having teeth 114.

Also supported on the platform 33, see FIGURE 1, is a journal 115 which rotatably supports a gear 116 on a vertical axle 117. The axle 117 is driven through a conventional gear box transmission or rear end differential 118 which is indicated as having meshing bevel gears 118a and 118b. The transmission 118, and particularly the gear 118a thereof, is connected through a universal joint 119 with a hollow rectangular sleeve 120 which is telescoped over and keyed to one end of a shaft 121. Trained around the gear 116 and the teeth 103 is an endless drive chain 122 (see FIGURES 1 and 9) having detachable links 123, 124 to serve a purpose to be described below. Conventional chain slack take-up means 125 is fixedly secured to the platform 33 and serves in its usual capacity.

The ring gear 113 is meshed with a sprocket gear 126 secured near the lower end of a shaft 127 having a bevel gear 128 secured to the upper end thereof. The lower end of the shaft 127 is mounted in a bearing 127' which is mounted on a plate 99' which in turn is welded or otherwise secured or forms a part of the channel member 99. The bevel gear 128 meshes with a second bevel gear 129 fixedly secured to a power input shaft of a conventional reversible speed reducer unit or automobile transmission 130 having a control lever 131. The unit 130 is mounted on a support plate 130a which is welded or otherwise secured to the flange 84. The output of the unit 130 is delivered to a sprocket 132.

Fixedly secured to the side 100 (see FIGS. 1 and 3) are a plurality of bearings 133 which support the opposed ends of the drive shaft 134 and a plurality of driven shafts 135. The opposed ends of the drive shaft 134 and the driven shafts 135 are provided with bevel gears 136 and 137, respectively, with the gears 136, 137 disposed in mesh, one with another to effect rotation of their respective shafts.

Fixedly secured to one end of the shaft 134 is a drive sprocket 138 placed in driving relation with the sprocket 132 by means of an endless chain 139. Also fixedly secured on the shafts 134, 135 are sprockets 140 disposed between the standards 81, 82, the sprockets 140 being placed in driving relation with the sprockets 97 by means of endless chains 141.

One end of an excavating and cutting blade 142 having an elongated substantially rectangular configuration is fixedly secured at the area 143 to the chain 141 by welding or other suitable means and is flexed into a curvilinear form to extend between the guides 74, 75 and through the slot 76 defined thereby and between the blade guides 77, 78 and through the slot 79 defined thereby to terminate therebelow in a cutting tip 144.

Suitable heavy duty cutting tips 543 (FIGS. 10 and 11) may also be attached to the lower ends of the cutting blades 142 by welding or other suitable means.

Removable blade braces 145 for the blades 142 are provided with a tapered lower tip 146 and extend through circumferentially spaced slots 147 formed in the base platform 33 between angularly inclined guide elements 148, 149 disposed above and below, respectively, the platform 33, the ends of the guide elements 148, 149 being fixedly secured between plates 150 (see FIG. 3) forming a part of mounting boxes 151 (see FIG. 2). The braces 145 adjacent their other respective ends 152 carry transverse pins or abutment members 153 to limit the downward movement thereof.

Power for driving the chains 122 and 141 from the sprocket 116 is derived from the shafts 120, 121, the other end of the latter being connected through a universal joint 154 of a conventional speed reducing unit 155. The speed reducing unit 155 is suitably supported in a bracket 156 fixedly secured to the chassis member 18, and the input side of the speed reducing unit 155 is driven through a main power shaft 157 and coupler 158. The shaft 157 is journaled for rotation, intermediate its respective ends in a bearing 159 as is the other end of the shaft 157. Fixedly secured on the shaft 157 is a gear 160, and adjacent the aforementioned other end thereof is fixedly secured, for rotation therewith a pulley 161.

An axle 162 is journaled for rotation in suitable brackets supported from the side frame member 18 and has fixedly secured thereto for rotation therewith a pulley 163. As is seen in FIG. 1 of the drawings, a gear 164 is keyed to or otherwise fixedly secured on the shaft 162 and meshes with the gear 160.

A pair of spaced and confronting substantially parallel support plates 165, 166 extend from the frame member 16 and support a first shaft 167. A hollow rotatable second shaft 168 is telescoped over the shaft 167, and a pair of spaced, confronting arms 169, 170 have one of their respective ends fixedly secured to the first shaft 167 and a rotatable slip idler roller 171 is rotatably supported between the other ends thereof. Another pair of like arms 172, 173 extend from the shaft 168 and carry a second slip idler roller 174 in like manner. An actuating lever 175 controls the operation and rotation of the shaft 167, as will be described below, and is itself actuated through a linkage member 176. The linkage member 176 is eccentrically mounted on a disc 177 fixedly secured to one end of a hollow cylindrical shaft 178 having a control lever 179 at the opposed end thereof. A second actuating lever 180 is fixedly secured to the shaft 168 and controls the rotation movement thereof through a linkage member 181 which is secured thereto and is connected eccentrically to a disc 182 mounted on a control shaft 183. The shaft 183 passes rotatably through the hollow shaft 178 and is carried by the frame member 18. As is seen in the drawings, the shaft 183 has a manually operable control lever 184 fixedly secured thereto.

One end of a power take-off shaft 185 is suitably supported in journals 186 carried on the cross-frame members 22. The power take-off shaft 185 has fixedly secured thereto for rotation therewith a drive pulley 186' which extends between the pair of confronting arms 169, 170 and a second pulley 187 is keyed or otherwise secured to the power take-off shaft 185 and is disposed between the confronting arms 172, 173. As is clearly seen in FIG. 1 of the drawings, an endless belt 188 is trained about the pulleys 161 and 186' and is threaded below the pulley 171. In a similar manner, an endless belt 189 is trained around the pulleys 163, 187 and is threaded below the pulley 174. The weight of the pulleys 171, 174 and the length of the belts 188, 189 are selected in such a manner that in the absence of the manual operation of the levers 179, 184, to effect movement of the linkage arms 176, 181 and consequently of either of the two shafts 167, 168, all of these taken together and in consideration of the inertia of the transmission heretofore described is sufficient to prevent the rotation of the shaft 157 either directly through the pulley belt 188 and the pulley 161 or through the reversing gears 160, 164.

The means for mounting the platform or outer table 33 to the vehicle 12 and for raising, lowering and tilting the same are illustrated in FIGS. 1, 2, 6, 7 and 8 and include a pair of confronting upright channel members 274, 276 which have their lower ends pivotally secured to the frame members 16, 18, respectively, by means of a cylindrical shaft 278 extending through aligned apertures 280, 282 formed in the frame members 16, 18 and through apertures in the channel members 274, 276. L-shaped support strips 286, 284 are slidably mounted on the channels 274, 276 in a manner described below and have a first rectangular mounting plate 288 extending therebetween, which is secured flush to the leading flange 25 of the base 24. A second mounting plate 290 also extends between the strips 284, 286 and has a pair of mounting arms 292, 294, of substantially L-shaped cross-sectional configuration, the arms 292, 294 extending obliquely outwardly and downwardly from the outer ends thereof for fixed connection with the opposed outer sides of the platform 33 by means of inwardly bent end sections 296, 298, respectively.

Angle irons 300, 302 are connected, as by welds 304, to the upper ends of the strips 284, 286, respectively, and each have integrally formed securing clips 306, 308 which serve to secure the arms 284, 286 and the angle irons 300, 302 slidably on the members 274, 276. The angle irons 300, 302 and clips 306, 308 are provided with outwardly turned reinforcing flanges 310, 312 and outwardly extending abutment guards 314, 316 positioned adjacent the lower ends of the angle irons 300, 302 which are engageable against end extensions of the shaft 278 to limit the downward movement thereof.

A substantially rectangular cross bar 318 is extended across the upper ends of the members 274, 276 and is slidable between the confronting bights thereof. A plurality of spacing blocks 320 connect the bar 318 to a second sliding cross bar 322 having a substantially H-shaped cross sectional configuration so that the bars 318 and 322 and the blocks 320 move longitudinally as a unit in the members 274, 276. A guide extension 396 is slidably positioned in channel member 276 (on the left as viewed in FIGS. 6 and 7) and the upper end 396b thereof is connected to the bars 318 and 322 to form a downward extension thereof terminating at its lower end 396a, for a purpose to be hereinafter described. A similar guide extension 397 (FIG. 7) is connected to the right hand ends of bars 318 and 322 and is slidable therewith. A substantially rectangular stationary cross member 324 extends between and is connected to the members 274, 276 adjacent the frames 16 and 18, and an extensible hydraulic lift mechanism 326, of conventional design, having a piston rod 326a secured thereto and to the cross member 322. A U-shaped structural member 328 is secured to the sides of each of the members 274, 276 by welding or other suitable means adjacent the upper ends thereof and extends therebetween, but such member 328 is not connected to the bars 318 and 322 or the blocks 320. A plurality of link chains 330 each have one of their respective adjacent ends secured to the fixed member 328 at 332 (FIG. 2). The chains 330 are each trained around idler gears 334 rotatably mounted between pairs of mounting plates 336, 338 secured on the upper side of the cross member 318, and the other ends of the chains 330 are secured to the mounting plate 290 at 340. It should be noted at this point that the hydraulic mechanism 326 is actuated by remote means (to be described) through a hydraulic pump 327 and is provided with conventional controls (not shown).

The pump 327 is driven by means of an extensible shaft 377 which is connected by universal joints 379 with the shaft 185 and the pumping side of the pump 327. Conventional flexible cables connect the pump 327 with the hydraulic device 326 in the usual conventional hydraulic circuit.

From the foregoing description, it should now be obvious that as the hydraulic device 326 is actuated to cause the cross bars 318 and 322, and the guide extensions 396 and 397 to move upwardly, the chains 330 will remain connected and fixed against upward movement at 332 (FIG. 2) but the intermediate portion of each of the chains 330 will travel around their respective pulleys 334 to carry the mounting means 290 attached to the lower ends of the chains 330 and the mounting means 292, 294 as well as the plate 288 upwardly. Obviously, the disconnection or reverse action of the hydraulic means as driven by the pump 327 will effect a reverse movement of the above named parts. When the bars 318 and 322 are moved upwardly by the piston rod 326a, such bars 318 and 322 will normally be raised above the upper ends of the channel members 274 and 276, and when that occurs, the guide extension 396 and 397 maintain the bars 318 and 322 in vertical alignment with the members 274 and 276 since a substantial length of each of such extensions 396 and 397 always remains in the members 276 and 274, respectively.

Figure 8:
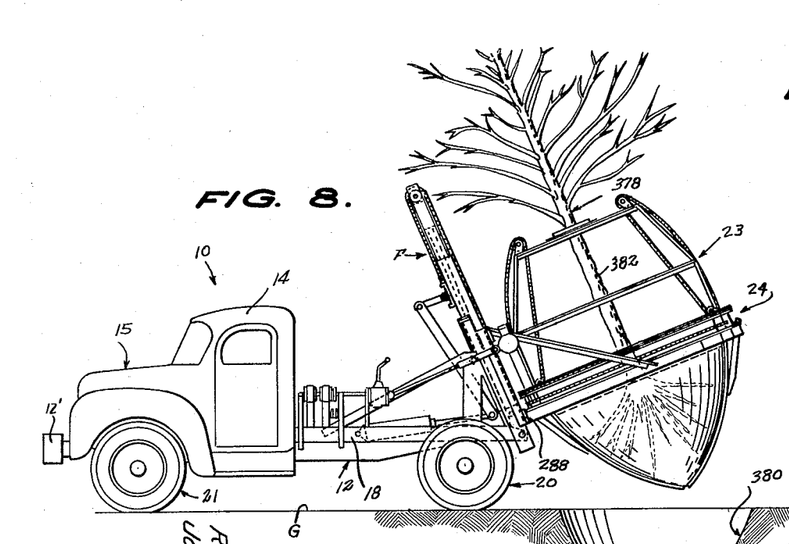
FIG. 8 is a side elevational view of the apparatus illustrating the relative arrangement of component elements thereof when in their respective positions during the performance of the portage function thereof.

As has been stated above, the members 274, 276 are pivotally connected on the frame members 16 and 18. The means employed for towing the machine to the position shown in FIG. 8 are as follows.

A second hydraulic mechanism 342 is mounted on a pivotal cross brace 344 extending between the frames 16 and 18 and is provided with an extensible plunger 346. The outer end of the plunger 346 is fixedly connected to a hollow tubular cross member 348 and a pair of spaced, confronting substantially parallel upwardly extending arms 350, 352 are pivotally connected to the outer ends thereof and have bosses 354, 356 intermediate their ends. Each of the frame members 16 and 18 have upright structural members 358, 360 secured perpendicularly thereto and reinforcing structural members 362, 364, respectively are also provided therefor and are secured to the frame members 16, 18, as well as second reinforcing structural members 366, 368. A substantially cylindrical rod 370 extends through apertures in the bosses 354 (FIG. 2) and the upright members 358, 360 which gives rise to a pivotal connection of the same therewith. The upper ends of the arms 350, 352 (FIG. 1) have a transverse rod 372, extending therebetween and beyond the outer ends thereof for pivotal connection with the ends of a pair of shortened arm members 374, 376, and the other ends of the shortened arm members 374, 376 are pivotally connected to the members 274, 276 at 378, 380.

In the performance of the towing operation, the platform 33 is first raised to its uppermost position by the use of the hydraulic mechanism described above. Then, the hydraulic mechanism 342 is actuated by remote means (not shown) thus elongating the piston rod 346 and placing the lower ends of the arms 350, 352 rearwardly and pivoting the same at the bosses 354, 356 thereof. The upper ends are thereby caused to move in the opposite direction and pull the arms 374, 376 along therewith. The members 274, 276 pivot at the junction thereof with the frame members 16, 18 and the mechanism is then positioned as is illustrated in FIG. 8.

In utilizing the foregoing machine in pursuance of a preferred method of tree transplantation, the machinery 10 is first taken to the chosen site to which the tree 378 is to be moved. When the new location of the tree has been chosen, the platform 33 is lowered to substantially ground contact and the cutting machine is actuated by the aforedescribed driving mechanisms from the power shaft 121. Of course, upon actuation of the ring gear 113, the sprocket 126 is driven to cause downward movement of the blades 142 and when the blades 142 have reached the dotted line position of FIGS. 3 and 4, the machine is deactivated, the platform raised and tilted. This leaves the cavity 380 in the ground conforming to a specified shape, that is, the area defined by the rotating blades in their lowermost position. The vehicle is then driven to a remote location and the earth removed from the cavity 380 is discarded.

The machine 10 is then taken to the tree 378 to be moved. The detachable plate 61 is now removed from its connection with the pins 64, 65 after having first disconnected the adjacent links 123, 124 of the chain 122. The flange 93 is disconnected from the pins 94 and the platform 33 is backed towards the tree until the trunk 382 is encircled by the ring or collar 92. The several parts described above as being removed from the device are replaced in their operating positions, the machinery is again activated. When the blades 142 have reached the end of their downward travel, the braces 145 are manually driven into place. The lift and tilt mechanism is again activated and the tree and root structure is lifted from the ground, and the tree is then taken to the prepared cavity 380 and lowered therein, whereupon the device is reversed thereby drawing the blades from around the tree and leaving the same embedded in its new location.

In addition to the embodiment of the invention disclosed above, several alternative structures of various components of the present invention are illustrated in FIGS. 10–17 and will be described hereinafter. The parts of the invention shown in FIGS. 10–17 which are identical with the parts shown in FIGS. 1–9 are identified by the same numerals and letters.

Figure 2:
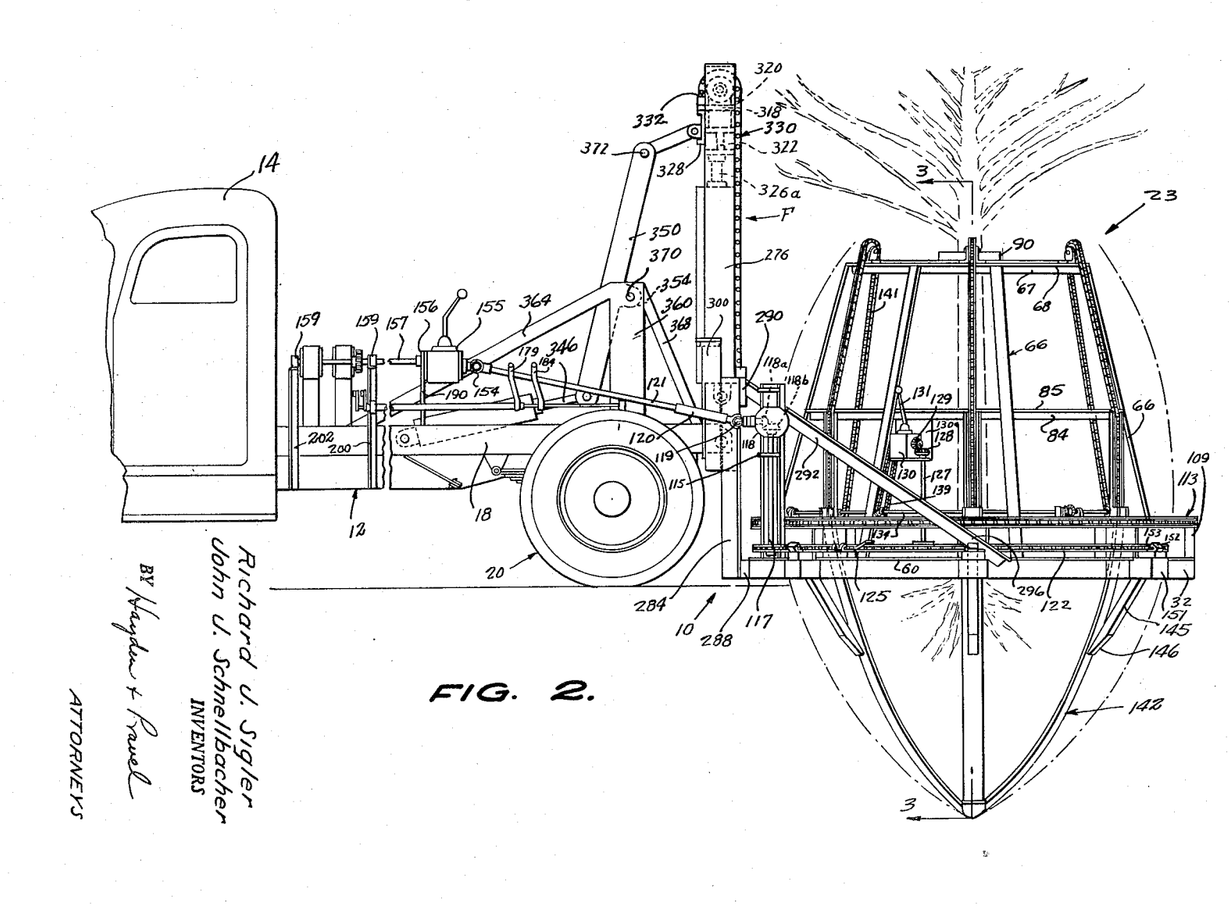
FIG. 2 is a fragmentary side elevational view of the machine and vehicle illustrated in FIG. 1, FIG. 2 illustrating in dotted lines the curvilinear plane traced by the excavating blades as they move from their open to their respective closed positions.
Figures 10, 11, 12:
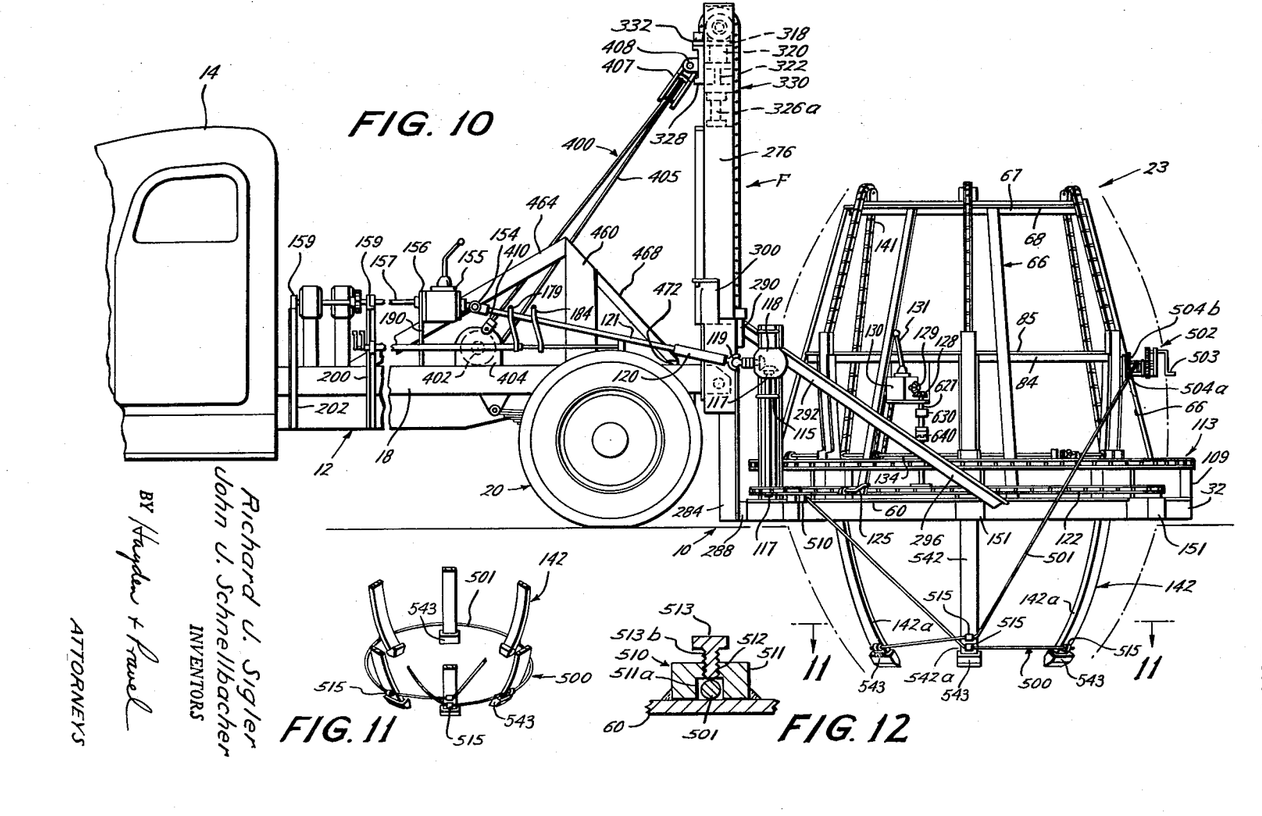
FIG. 10 is a view similar to FIG. 2 illustrating an alternate form of tilting mechanism, the blades in an intermediate position and an alternate form of blade support.
FIG. 11 is an isometric view of the blades taken along line 11—11 of FIG. 10 illustrating the position of the blade support cable on the blades.
FIG. 12 is a detailed sectional view illustrating the clamp means for retaining one end of the cable shown in FIGS. 10 and 11.

In lieu of the hydraulic tilting mechanism 342, best seen in FIG. 2, the operation of which has been previously explained, a cable and winch tilting mechanism generally indicated as 400 is substituted in the form of FIG. 10. A standard winch 402 is mounted between a support plate 404 mounted vertically on the frame member 18 and a similar support plate (not shown) on frame member 16. One end of a cable 405 is connected to the winch drum 402 so as to be wound thereon and unwound therefrom. The other end of the cable 405 is passed through a pulley block 407 which is pivotally mounted at pivot pin 408 to the U-shaped structural member 328 and then the lower end of the cable 405 is secured to the plate 404 by means of a clamp 410 or any other suitable attaching means.

Each of the frame members 16 and 18 has an upright structural member 460 secured perpendicularly thereto and additional reinforcing structural members 464 also connected thereto. Shorter upright members 472 are secured perpendicularly on the frame members 16, 18 to the rear of the members 460 and second reinforcing structural members 468 are secured on each of their respective ends to the upright members 460, 472. The members 460, 464, 468 and 470 serve as a stop for the apparatus 10 when such apparatus 10 is tilted as viewed in FIG. 8 and also give additional rigidity to the frame members 16, 18.

The winch 402 is actuated by a remote means (not shown) and as the cable 405 is wound around the winch drum, the pulley block 407 is drawn downwardly thus causing the members 274 and 276 to pivot at the juncture with the frame members 16, 18 in the same manner as previously described for the operation of the hydraulic mechanism 342.

It can be appreciated that variations may be made in the number and arrangement of blocks and cables whereby the mechanical advantage may be improved without departing from the scope of the invention. In fact the pulley blocks may be eliminated and one end of the cable fastened directly to the member 328 and the other end of the cable attached to the winch drum so that the cable may be wound thereon to tilt the apparatus 10 and thereafter unwound to return the apparatus 10 to its normally upright position.

Referring again to FIG. 10 of the drawings and also to FIG. 11, a support cable designated generally at 500 is illustrated which is used to support the blades 142 and may be used in conjunction with or in lieu of the blade braces 145 which are shown in FIG. 2.

In FIGS. 10 and 11 the tree, earth and roots have been omitted and the blades 142 are shown in an intermediate position. This has been done for illustrative purposes so that the arrangement of the cable 501 in relation to the blades 142 will be more readily apparent.

The cable support mechanism 500 comprises the cable 501, the winch 502, the cable clamp 510 and the brackets 515. One end of the cable 501 is attached to the conventional hand operated winch 502 which is mounted on the channel member 66 or any other convenient place on the carriage 59 by any suitable means such as welding or the like. The other end of the cable 501 is secured to the riding member or inner table 60 or any other convenient part of the carriage 59 and preferably outboard of the blades 142 by means of a cable clamp 510 or other suitable attaching means. An eye bracket 515 is welded or otherwise suitably attached to the lower end on the outboard side of each of the blades 142. Each of such eye brackets 515 is provided with an opening through which the cable 501 is guided. One of the blades 142 which is specifically designated 542 has two eye brackets 515 secured thereon, one above the other. Prior to connecting the cable 501 to the clamp 510, the cable 501 is first inserted through the upper eye bracket 515 on the blade 542 and then through each of the eye brackets 515 on the other blades 142 and finally through the lower eye bracket 515 on the blade 542. After all of the blades 142 have been thus connected together, the end of the cable 501 is secured by the clamp 510.

As the blades 142 are moved downwardly in a manner previously described, the handle 503 of the winch 502 is turned so as to wind the cable 501 on the winch 502 keeping the cable 501 generally free of slack, but sufficiently loose so as not to bind. A standard one-way clutch or ratchet 504a and ratchet finger 504b is on the winch 502 to prevent the cable 501 from being inadvertently released or slackened during the winding of the cable 501 on the winch 502. As the handle 503 is turned in a clockwise manner as viewed from the right in FIG. 10, the ratchet finger 504b is moved from the ratchet 504a and does not prevent the cable 501 from being wound on the winch 502. The ratchet finger 504b is of course adjustable so that it may be moved so as to permit the cable 501 to be unwound from the winch 502 when desired.

The winch 502 and cable clamp 510 being mounted on the carriage 59 move with the carriage 59 as the carriage 59 is rotated during digging operations. It can therefore be appreciated that the blades 142, winch 502 and cable clamp 510 rotate together during the digging operations. The blades 142 are supported or braced by the cable 501 throughout digging operations. During such digging operations and after the earth section has been severed, outward movement of the blades 142 is prevented as the cable 501 holds the blades 142 together at their lower ends 142a and 542a. Even though the blades 142 may be made from a high carbon steel, such blades 142 may tend to spring outwardly when a large section of earth is retained therein. The use of the cable and winch mechanism 500 prevents the blades 142 from being forced or sprung open by the weight of the earth held therein.

When it is desired to release the earth section from the blades 142 after such earth section has been cut and confined by such blades 142 as previously explained, the cable clamp 510 is released from the cable 501 and the cable 501 is wound on the winch 502.

The cable clamp 510 may be of any suitable type and as illustrated in the drawings (FIG. 12) includes a U-shaped bracket 511 with a threaded hole 512 therein for receiving the bolt 513. The bracket 511 is welded or otherwise secured to the carriage 59. The bolt 513 has an enlarged head 513a which may be easily engaged by a wrench or other suitable device and a threaded shank 513b for engagement with the threaded hole 512. The end of the cable 501 is inserted through the opening 511a in the U-shaped bracket 511 and the bolt 513 is tightened thereon thus locking the cable 501 firmly against the carriage 59. The cable 501 is easily released from the cable clamp 510 by loosening the bolt 513 and withdrawing the cable 501 from the bracket 511.

Figure 13:
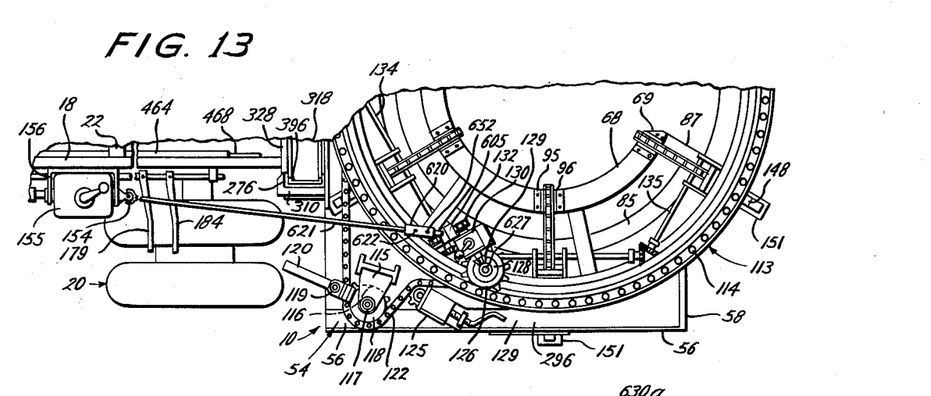
FIG. 13 is a fragmentary plan view similar to FIG. 1 illustrating an alternate embodiment of the invention.
Figure 14:
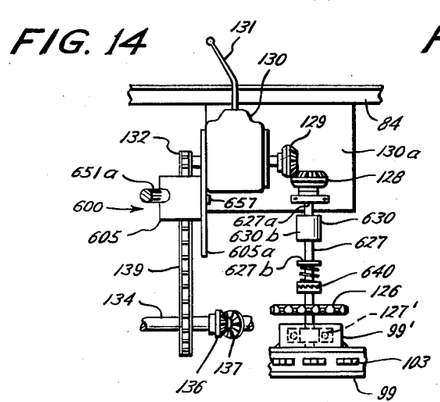
FIG. 14 is an elevation showing details of an alternate embodiment of a modified drive mechanism for the blade withdrawal mechanism.

Sometimes in digging operations it is desirable to withdraw or raise the blades 142 without rotating the carriage 59. One means of accomplishing such blade withdrawal is illustrated in FIGS. 10 and 13 with additional details being shown in FIGS. 14–17.

The blade withdrawal mechanism is indicated generally at 600 and includes the gear box 605, the drive shaft 621, the vertical shaft 627, slip collar 630 and ratchet collar 640.

Figure 17:
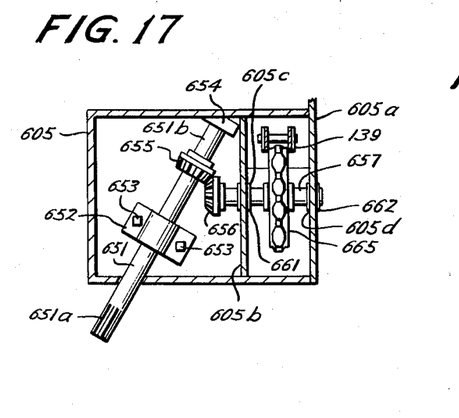
FIG. 17 is a plan view illustrating further details of a portion of the device shown in FIG. 14.

The transmission or speed reducer unit 155 is utilized to transmit power to the blade withdrawal mechanism 600 from the power take-off shaft 185 (FIG. 1). A shaft 621 similar to the shaft 121, but longer, is connected at one end through the universal joint 154 to the unit 155 in lieu of the shaft 121 which has been previously disconnected. The other end of the shaft 621 is connected to the end 651a of a shaft 651 extending from a gear box 605, which will be described hereinafter. Such connection is established by a sleeve 620 which is positioned over the shaft 651. The end 651a of the shaft 651 and the ends of the shaft 621 are splined as best seen in FIG. 17 and the internal surface of the sleeve 620 is similarly splined so that when the sleeve 620 is fitted over the ends of the shafts 621 and 651, the shaft 651 turns with the shaft 621. The sleeve 620 is releasably locked against longitudinal movement with respect to the shaft 621 and the shaft 651 by any means such as set screws 622 and 652.

The shaft 651 is supported in the gear box 605 by means of a bearing 652 which is mounted on the gear box 605 by bolts 653 or other suitable means, and the end 651b of the shaft 651 is positioned in a bushing or bearing 654 which is welded or otherwise attached to the gear box 605. A bevel gear 655 is fixed on the shaft 651 between the bushing 654 and bracket 652 which meshes with second bevel gear 656 on the shaft 657. The shaft 657 is positioned in bearings 661 and 662 which are mounted in openings 605c and 605d, respectively in the plates 605b and 605a, respectively, of the gear box 605. The plate 605a is welded or otherwise secured to the support plate 130a. A sprocket 665 is fixed on the shaft 657 between the bearings 661 and 662 so as to rotate with the shaft 657. The chain 139 is driven by the sprocket 665 and in turn drives the shaft 134 and the parts of the blade raising and lowering mechanism connected therewith as explained above. The chain 139 is also meshed with the sprocket 132 which is operably connected to the standard transmission 130. Also connected to the transmission 130 are the bevel gears 129 and 128 as previously explained. The gear 128 is mounted on a shaft 627 which is similar to the shaft 127 (FIG. 2) except that the shaft 627 is in two sections 627a and 627b held together by a slip collar 630 and has a conventional one way clutch or ratchet 640 positioned on such shaft 627 just below the slip collar 630.

With the drive shaft 621 connected to the transmission 155 and the gear box 605 as explained above the blades 142 may be raised and lowered without rotation of the carriage 59.

The raising of the blades 142 without rotation thereof is important when removing the blades 142 after the section of dirt has been cut and positioned in a container of the type disclosed in copending U.S. patent application Serial No. 833,565. For accomplishing such raising and lowering of the blades 142 without rotation thereof the gear shift 131 is placed in a neutral position and no power is transmitted through the unit 130 to the gear 129 and hence to the shaft 627. This arrangement in effect stops any power from being transferred to the rotation producing mechanism and therefore, the carriage 59 and the parts rotatable therewith remain stationary.

During a normal digging operation when the shaft 121 is utilized rather than the shaft 621, the carriage 59 may be reciprocated or rotated back and forth to increase the digging action with the blades 142. In such case, in order to prevent the blades 142 from moving upwardly or from being withdrawn when the carriage 59 is reversed in rotation in a direction opposite to the normal digging direction, the one way clutch 640 permits the carriage 59 to be rotated in reverse to the normal digging direction without operating the blade raising mechanism, but of course the blades 142 are lowered as previously described when the carriage 59 is rotated in the normal digging direction.

Figure 15:
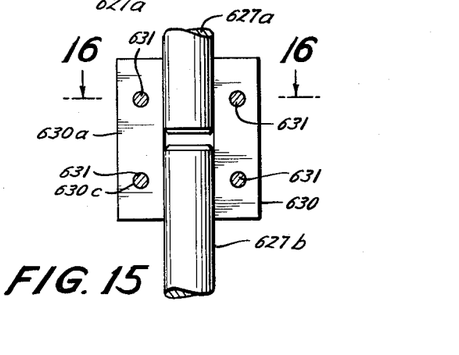
FIG. 15 is a side view of the slip collar taken on line 15—15 of FIG. 16.
Figure 16:
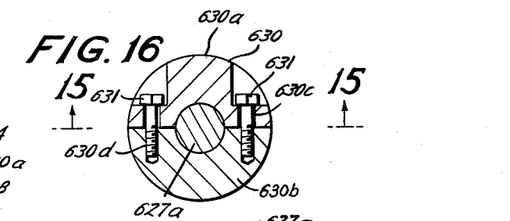
FIG. 16 is a cross-sectional view taken along line 16—16 of FIG. 15.

As best seen in FIGS. 15 and 16, the slip collar 630 includes two semi-cylindrical bodies 630a and 630b which surround the shaft sections 627a, 627b to hold them together, as will be explained. The body 630a has openings 630c through which bolts 631 may be inserted and the body 630b has threaded holes 630d which are threadedly engaged by the bolts 631 to secure the two bodies 630a and 630b together around the shaft sections 627a and 627b. The shaft sections 627a and 627b are locked together by placing the slip collar bodies 630a and 630b on the ends of the shafts 627a and 627b (FIG. 15) and by then tightening the bolts 631. Such bodies 630a and 630b therefore frictionally hold the ends of the shafts 627a and 627b against relative rotation during normal loads on such shafts 627a and 627b. However, if the blades 142 become stuck during a digging operation or an excess load is otherwise placed on the shaft 627a, then the shaft 627b may slip or rotate in the bodies 630a and 630b without rotating the shaft 627a, thereby preventing an overload on the driving engine or power source.

In the operation or use of the form of the invention shown in FIGS. 10–17, the shaft 121 would normally be connected as shown in FIG. 10 for the normal digging operations and the shaft 621 would be disconnected and therefore would be idle. The form of the invention shown in FIGS. 10–17 would be operated or used in substantially the same manner as heretofore described in connection with FIGS. 1–9, with certain differences which have been previously described in detail, particularly in connection with the cable 501 which is utilized for retaining the blades 142 from being forced outwardly when the section of dirt has been cut and is being lifted from the hole. As previously explained, the cable 501 rotates with the rotatable blade carriage 59 as the blades 142 are moved downwardly in the earth, the slack in the cable 501 is gradually taken up with the winch or reel 502. Therefore, when the blades 142 have reached their lowermost position and the section of dirt is cut and is confined within such blades 142, the cable 501 holds the lower ends of the blades 142 against outward movement relative to each other. Therefore, when the blade carriage 59 is raised or lifted upwardly by the operation of the hydraulic cylinder 326, as previously explained in connection with FIGS. 1–9, the blades 142 are prevented from moving away from each other and therefore the section of dirt confined within the blades 142 is prevented from falling or dropping therefrom.

The cable 501, as previously explained, is released from the clamp 510 and is thereafter wound upon the winch or reel 502 to completely withdraw the cable 501 from the blades 142 when it is desired to retract or withdraw the blades 142.

The retraction or withdrawal of the blades 142 for the purpose of leaving a cut section of dirt in a container in the hole as explained more in detail in said patent application Serial No. 833,565, the shaft 121 is replaced with the shaft 621 so that the blades 142 are raised upwardly without rotating the blade carriage 59, as previously noted.

It should also be pointed out that the blade carriage 59 when lifted upwardly with the hydraulic cylinder 326, as explained in connection with FIGS. 1–9, the modified construction shown in FIG. 10 which includes the winch and cable mechanism 400, it is utilized for tilting the framework designated generally at F which supports the chains 330 to tilt the blade carriage 59 for transportation purposes in the same manner as previously described in connection with the tilting of the framework F with the hydraulic mechanism in FIGS. 1–9.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An excavating machine comprising a main digging and portage transporting frame assembly including an open stationary base, a platform fixedly secured to said base, said platform having an opening formed therein, an open circular riding member rotatable on said platform, an open superstructure extending upwardly from said riding member and rotatable therewith, a plurality of blades operably mounted on said superstructure for rotation therewith, means on said superstructure for mounting said blades for simultaneous substantially vertical movement, and means for supplying motive power to said superstructure.

2. An excavating machine as defined in claim 1 wherein said base and said platform and said superstructure are provided with openings which may be co-aligned in order to allow said machine to be positioned around an upwardly projecting object to be excavated.

3. An excavating machine as defined in claim 1 wherein said superstructure comprises a plurality of channel members extending convergingly upward from said riding member, a circular upper support fixedly secured to the upper ends of said channel members, a central brace ring fixedly secured intermediate the ends of said channel members, a plurality of pairs of spaced support brackets fixedly secured to the upper side of said riding member, cross blocks between said brackets, integrally formed upward arm extensions for each of said brackets, means connecting each pair of said arm extensions, the upper ends of said arm extensions being secured to said central ring, drive shafts extending through each of said pairs of said arm extensions, a lower gear wheel for each of said shafts positioned between said arm extensions, co-aligned upper gear wheels suitably mounted on said upper support, an endless link chain trained around each co-aligned pair of upper and lower gears, and said blades having one of their ends fixedly secured to one of the links of chain whereby movement of said chain effects substantially vertical movement of said blades.

4. An excavating machine as defined in claim 3 wherein said base is provided with a plurality of blade brace supports spaced at suitable intervals therearound for alignment with said blades when said machine is deactivated.

5. An excavating machine as defined in claim 3 wherein said circular upper support is provided with an object gripping means comprising an annular gripping ring having a removable section, and said ring is connected with said upper support by means of a plurality of radial spines extending therebetween.

6. The machine of claim 1 wherein a plurality of side and bottom roller means are provided on said platform, said bottom roller means including a plurality of pairs of roller axle support housings fixedly secured in circular arrangement around said opening in said platform, said platform having a like plurality of slots formed therein subjacent to each of said pairs of said housings, a substantially cylindrical bottom roller rotatably mounted between each of said pairs of said roller housings and extending partially into said slots in said platform, said side roller assemblies being arranged in concentric relationship relative to said bottom roller assemblies, each of said side rollers having a base portion secured to said platform and having a substantially hollow, rectangular roller housing with an open face, a substantially cylindrical side roller rotatably mounted in said side roller housing and extending through said open face thereof, and said roller riding member having its underside in contact with said bottom rollers and its outer circumferential edge in contact with said side rollers.

7. An excavating machine comprising a main digging and portage frame assembly including an open stationary base, a platform fixedly secured to said base, said platform having an opening formed therein, an open circular riding member rotatable on said platform, an open substantially frusto-conical superstructure extending upwardly from said riding member and rotatable therewith, said superstructure comprising a plurality of channel members extending convergingly upward from said riding member, a circular upper support fixedly secured to the upper ends of said channel members, a central brace ring fixedly secured intermediate the ends of said channel members, a plurality of pairs of spaced support brackets fixedly secured to the upper side of said riding member, cross blocks between said brackets, integrally formed upward arm extensions for each of said brackets, cross members between each pair of said arm extensions, the upper ends of said arm extensions being secured to said central ring, a drive shaft extending through each of said pairs of said arm extensions, a lower gear wheel for each of said shafts positioned between said arm extensions, co-aligned upper gear wheels mounted on said upper support, an endless link chain trained around each co-aligned pair of upper and lower gears, a plurality of blades operably mounted on said chains, said blades having one of their ends fixedly secured to one of the links of said chain whereby movement of said chain imparts substantially vertical movement to said blades, means for supplying motive power to said frame, said means comprising a remote power source, an annular channel shaped gear having teeth formed in the bight thereof secured around said brackets, a link chain trained around said annular gear, means for driving said chain, a chain tightener for facilitating the removal and replacement of said chain, an annular link element supported on a plurality of rectangular support members extending outwardly from the upper side of said platform, the links of said link element being in engagement with a toothed gear wheel depending from and secured to the lower end of an upright connecting rod, said connecting rod being rotatably secured to a gear box mounted on said superstructure, a reduction gear assembly connected to said gear wheel and to said shaft whereby the movement of said link chain rotates said superstructure and said gear wheel and causes said blades to be moved simultaneously vertically and circularly.

8. An excavating apparatus comprising a prime mover having a rearwardly extending frame, a lift and tilting mechanism secured to the outer terminal end of said frame, a digging and portage frame assembly including a plurality of blades extending longitudinally for lateral movement about a substantially vertical axis and carried by said lift and tilting mechanism, and said digging and portage frame assembly having a substantially central longitudinal opening therein adapted to receive a tree and the like.

9. An excavating apparatus as defined in claim 8 wherein said digging and portage frame assembly comprises an open stationary base, a platform fixedly secured to said base, said platform having an opening formed therein, an open circular riding member rotatable on said platform, an open superstructure extending upwardly from said riding member and rotatable therewith, a plurality of blades operably mounted on said superstructure for rotation therewith, means on said superstructure for mounting said blades for simultaneous vertical movement, and means for supplying motive power to said superstructure.

10. An excavating apparatus as defined in claim 9 wherein said superstructure comprises a plurality of channel members extending convergingly upward from said riding member, a circular support fixedly secured to the upper ends of said channel members, a central brace ring fixedly secured intermediate the ends of said channel members, a plurality of pairs of spaced support brackets fixedly secured to the upper side of said riding member, cross blocks between said brackets, integrally formed upper arm extensions for each of said brackets, cross members between each pair of said arm extensions, the upper ends of said arm extensions being secured to said central ring, drive shafts extending through each of said pairs of said arm extensions, a lower gear wheel for each of said shafts positioned between said arm extensions, a co-aligned upper gear wheel mounted on said upper support, an endless link chain trained around each co-aligned pair of upper and lower gears, and said blades having one of their ends fixedly secured to one of the links of said chain whereby movement of said chains effect substantially vertical movement of said blades.

11. An excavating apparatus as defined in claim 8 comprising a main digging and portage frame assembly including an open stationary base, a platform fixedly secured to said base, said platform having an opening formed therein, an open circular riding member rotatable on said platform, an open substantially frusto-conical superstructure extending upwardly from said riding member and rotatable therewith, said superstructure comprising a plurality of channel members extending convergingly upward from said riding member, a circular upper support fixedly secured to the upper ends of said channel members, a central brace ring fixedly secured intermediate the ends of said channel members, a plurality of pairs of spaced support brackets fixedly secured to the upper side of said riding member, cross blocks between said brackets, integrally formed upward arm extensions for each of said brackets, cross members between each pair of said arm extensions, the upper ends of said arm extensions being secured to said central ring, drive shafts extending through each of said pairs of said arm extensions, a lower gear wheel for each of said shafts positioned between said arm extensions, co-aligned upper gear wheels mounted on said upper support, an endless link chain trained around each co-aligned pair of upper and lower gears, a plurality of blades operably mounted on said chains, and said blades having one of their ends fixedly secured to one of the links of said chain whereby movement of said chain effects vertical movement of said blades, means for supplying motive power to said frame, said means comprising a remote power source, an annular channeled shaped gear having teeth formed in the bight thereof secured around said brackets, a link chain trained around said annular gear, means for driving said gear, a chain tightener for facilitating the removal and replacement of said chain, an annular link element supported on a plurality of rectangular support members extending outwardly from the upper side of said platform, the links of said link element being in engagement with a toothed gear wheel depending from and secured to the lower end of an upright connecting rod, said connecting rod being rotatably secured to a gear box mounted on said superstructure, a reduction gear assembly connected to said gear wheel and to said shaft whereby the movement of said link chain will rotate said superstructure and said gear wheel and cause said blades to move simultaneously vertically and circularly.

12. An excavating apparatus as defined in claim 8 wherein said lift and tilting mechanism comprises a pair of confronting upright channel members having their lower ends pivotally secured to the outer ends of said frame of said vehicle, a substantially L-shaped support strip slideably mounted by means secured thereto on each of said channel members, a first rectangular mounting plate extending between and secured to said support strips and fixedly secured flush against the leading end of said base of said frame assembly, a second rectangular mounting plate spaced from said first plate, mounting arms extending outwardly and downwardly therefrom for connection with the platform of said frame assembly, a lift mechanism for raising and lowering said support strips and plates, and means for tilting the upright channel members and the elements carried thereby.

13. An excavating apparatus for use in the transplantation of growing trees comprising, in combination, an excavating apparatus including a vehicle having a forward cab section, rearwardly extending spaced apart frame members, and front and rear wheel assemblies; a lift and tilting mechanism secured to the outer terminal ends of said frame members; and a digging and portage frame assembly carried by said lift and tilting mechanism, said digging and portage assembly including an open stationary base having a rectilinear leading end and an opposed curvilinear trailing end, said trailing end having an opening formed therein, a platform fixedly secured to the upper side of said base, said platform having a key hole slot formed therein, said key hole slot having an opening co-aligned with said opening in said base formed therein, an open circular riding member rotatable on said platform, said riding member having a removable section capable of co-alignment with said openings in said base and said platform, an open substantially frusto-conical superstructure extending upwardly from said riding member and rotatable therewith, said superstructure comprising a plurality of channel members extending convergingly upward from said riding member, a circular upper support fixedly secured to the upper ends of said channel members, a central brace ring fixedly secured intermediate the ends of said channel members, a plurality of pairs of spaced support brackets fixedly secured to the upper side of said riding member, cross blocks between said brackets, integrally formed upward arm extensions for each of said brackets, cross members between each pair of said arm extensions, the upper ends of said arm extensions being secured to said central ring, a drive shaft extending through each of said pairs of arm extensions, a lower gear wheel for each of said shafts positioned between said arm extensions, co-aligned upper gear wheels suitably mounted on said upper support, an endless link chain trained around each co-aligned pair of upper and lower gears, a plurality of blades operably mounted on said chains and having one of their ends fixedly secured to one of the links thereof whereby movement of said chain effects vertical movement of said blades, means for supplying motive power to said frame, said means including drive shafts extending through each of said pairs of said brackets, a lower gear wheel for each of said shafts positioned between said brackets, co-aligned upper gear wheels mounted on said upper support, an endless link chain trained around each co-aligned pair of upper and lower gears, a remote power source, an annular channeled shaped gear having teeth formed in the bight thereof secured around said brackets, a link chain trained around said annular gear, means for driving said chain, a chain tightener for facilitating the removal and replacement of said chain, an annular link element supported on a plurality of rectangular support members extending outwardly from the upper side of said platform, the lengths of said link element being in engagement with a toothed gear wheel depending from and secured to the lower end of an upright connecting rod, said connecting rod being rotatably secured to a gear box mounted on said superstructure, a reduction gear assembly connected to said gear wheel and to said shaft whereby the movement of said link chain will rotate said superstructure and said gear wheel and cause said blades to move simultaneously vertically and circularly.

14. An apparatus for digging a section of dirt from the ground, comprising a support, a plurality of circumferentially spaced cutting blades mounted on said support, means for moving said blades arcuately relative to the longitudinal periphery of the section of dirt to be cut, means for feeding said blades downwardly into the ground as they are moved arcuately to thereby cut said section of dirt, including support means for retaining the ends of said blades together when said blades are in a lowered position, wherein said support means comprises a cable, a clamp means for securing one end of said cable, means on said blades whereby said cable may be inserted therethrough, thereby linking said cable and said blades together, and winch means on said support for connecting the other end of said cable and controlling the length of said cable.

15. A tree excavating machine comprising; a vertically split outer table having an annular opening formed therein about a vertical axis, means mounting said outer table on a vehicle for raising and lowering movement, a hoisting means carried by said vehicle and attached to said outer table to raise and lower said table, a split, rotary annular inner table supported by said outer table to rotate with relation thereto about said vertical axis, a drive on said vehicle connected to rotate said inner table and blades carried by said inner table and extending downwardly therefrom for excavating a tree or the like during said rotation, the connection between said inner table and said blades being such that the blades may be moved downwardly and toward said axis of rotation.

16. A tree excavating machine comprising; a vertically split outer table having an annular opening formed therein about a vertical axis, means mounting said outer table for raising and lowering movement, a hoisting means attached to said outer table to raise and lower said table, a split, rotary annular inner table supported by said outer table to rotate with relation thereto about said vertical axis, a drive means to rotate said inner table and blades carried by said inner table and extending downwardly therefrom for excavating a tree or the like during said rotation, the connection between said inner table and said blades being such that the blades may be moved downwardly and toward said axis of rotation.

17. An apparatus for digging a section of earth from the ground comprising: a non-rotatable support, a rotatable blade carrying member, a plurality of circumferentially spaced cutting blades mounted on said member, first means for moving said blades arcuately relative to said support, second means for feeding said blades downwardly into the ground as they are moved arcuately to thereby cut a section of earth, said second means being selectively operable to retract said blades from their lowered position, a power source mounted on said support, and power transmission means interconnecting said power source and said first and second means for selective operation thereof.

References Cited in the file of this patent
UNITED STATES PATENTS

| | | |
|---|---|---|
| 293,490 | Miles | Feb. 12, 1884 |
| 501,630 | Scott et al. | July 18, 1893 |
| 513,824 | Pilcher | Jan. 30, 1894 |
| 1,225,188 | Smith | May 8, 1917 |
| 1,431,185 | Rowley | Oct. 10, 1922 |
| 1,466,168 | Holton | Aug. 28, 1923 |
| 1,932,527 | Long | Oct. 31, 1933 |
| 2,313,604 | Vogel | Mar. 9, 1943 |
| 2,314,567 | Vogel | Mar. 23, 1943 |
| 2,490,698 | McClenny | Dec. 6, 1949 |
| 2,558,642 | Clark et al. | June 26, 1951 |
| 2,729,493 | Engel | Jan. 3, 1956 |
| 2,769,278 | Wessell et al. | Nov. 6, 1956 |
| 2,775,428 | Monthan | Dec. 25, 1956 |